May 19, 1925.  
S. HOLDENER  
TOOTH FORMATION OF INTERNAL GEARS  
Original Filed March 13, 1924  
1,538,328
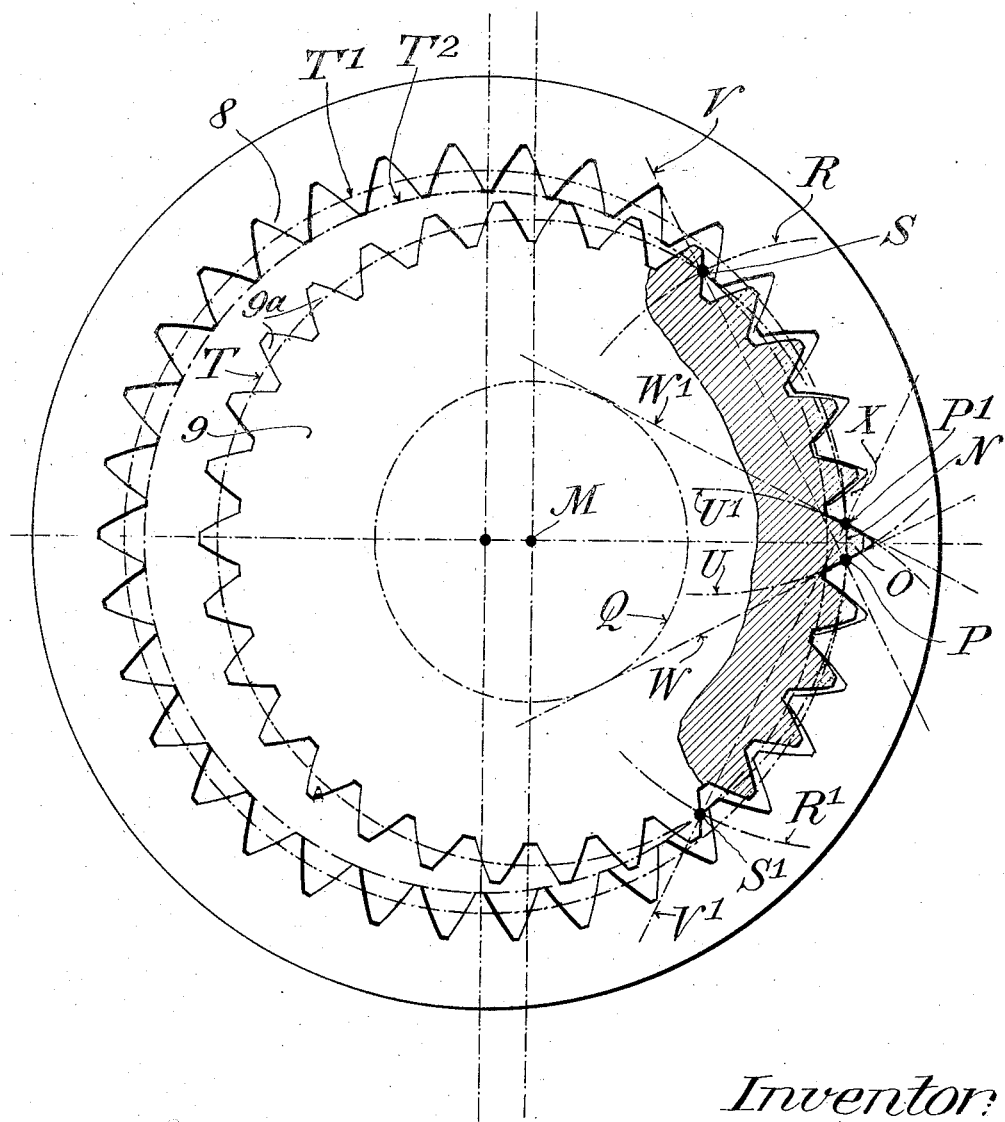
Inventor:  
Simon Holdener,  
By [signature] atty.

Patented May 19, 1925.

1,538,328

UNITED STATES PATENT OFFICE.

SIMON HOLDENER, OF WOLFSHAUSEN, SWITZERLAND.

TOOTH FORMATION OF INTERNAL GEARS.

Original application filed March 13, 1924, Serial No. 698,984. Divided and this application filed December 15, 1924. Serial No. 756,023.

*To all whom it may concern:*

Be it known that I, SIMON HOLDENER, a citizen of the Republic of Switzerland, residing at Wolfshausen, Switzerland, have invented certain new and useful Improvements in Tooth Formation of Internal Gears, of which the following is a specification, reference being had therein to the accompanying drawings.

The present application, which is a divisional application of my application Ser. No. 698,984, filed March 13, 1924, relates to improvements in the tooth formation of internal gears, which gears are particularly applicable to transmission gears such as disclosed in the above mentioned earlier application.

With the present tooth formation the flanks of the teeth of the outer and the inner toothed rims comprising circular arcs of the same radius, which corresponds to the radius of the smaller pitch circle and the centre of said arcs of the teeth of the inner rim being situated on the pitch circle of the latter and the centre of the arcs of the teeth of the outer rim being situated on an auxiliary circle which is concentric to the pitch circle of the outer rim, the auxiliary circle passing through the centres of curvature of the flanks of a tooth of the smaller wheel when the latter is in its extreme position of engagement so that contact surfaces between cooperating teeth are obtained that are as large as possible.

This effect in combination with a favourable cross-section of the teeth ensures that with the gear running in an oil-bath between cooperating teeth a comparatively large oil-pressure surface is obtained and a noiseless running of the gear.

A constructional example of an internal gear showing the tooth formation according to the present invention is illustrated on the accompanying drawing in an elevation view, with parts illustrated in section.

In the drawing two co-operating toothed rims 8 and $9^a$, which are eccentric to each other, are illustrated. The toothed rim 8 is internally toothed, the number of teeth being 34, and the toothed rim $9^a$ is provided with 30 external teeth. M denotes the centre of the toothed rim $9^a$ which is provided, for instance on the transmitting member 9 carrying out eccentric movements as disclosed in the specification Ser. No. 698,984. T and $T^1$ are the pitch circles of the toothed rims 8 and $9^a$, the pitch circles contacting in N, the toothings have diametral pitch. A straight line passing through M and N forms the centre line of the tooth O of the rim $9^a$ which is the position of its maximum engagement. P and $P^1$ are the points of intersection of the faces of the tooth O with the pitch circle T. Q designates an auxiliary circle having the centre M, the diameter of this circle being equal to the radius of the smaller pitch circle T.

In order to obtain the centres of the circular arcs forming the flanks of the tooth O arcs R and $R^1$ respectively are drawn from the points P, $P^1$ respectively as centres and with a radius that is equal to the radius of the pitch circle T, the arcs intersecting this pitch circle in S and $S^1$. The points of intersection S and $S^1$ obtained in this manner represent the centres of the circular arcs U and $U^1$ respectively, forming the flanks of the tooth O. The straight lines V and $V^1$ respectively passing through the points S, P and $S^1$, $P^1$ respectively are perpendicular on the tangents W and $W^1$ respectively passing through the points P and $P^1$ respectively and contacting with the auxiliary circle Q. The shape of the tooth O is completed by drawing the addendum circle and the dedendum circle.

To this shape of tooth the shape of the co-operating tooth X of the rim 8 corresponds. The flanks of the tooth X are formed by circular arcs having the same radius as the flanks of the tooth O. The centres of curvature of the flanks of the tooth X are situated on the auxiliary circle $T^2$ which is concentric to the pitch circle $T^1$ of the toothed rim 8 and passes through the points of intersection S and $S^1$.

The small clearance of the co-operating flanks required owing to the small difference in the number of teeth of the two rims is provided by the elasticity of the material together with the small limits used in manufacturing the teeth.

In order to obtain the necessary clearance at the bottom of the teeth the root of tooth is chosen larger than the point of tooth in the manner known with toothings having diametral pitch. The distance between the addendum circle and the dedendum circle and the pitch circle may also be chosen in a different manner to that illustrated.

The co-operating teeth possess a favourable cross-section and large contacting surfaces so that between these surfaces large oil pressure surfaces are formed when the gear works in an oil-bath, whereby a noiseless working of the gear is attained.

To ensure a better working of the two toothed rims with a greater difference in the number of teeth the flanks of the teeth of the internally toothed rim 8 on the point of the teeth may advantageously be formed as flat surfaces. The flanks above the pitch circle are preferably shaped according to the tangents W and $W^1$ respectively, which are drawn to contact with the auxiliary circle Q concentric to the pitch circle of the outer toothing from the point of intersection between the flank of the space of tooth at the point of maximum engagement and the pitch circle.

I claim:

1. In an internal gearing two eccentric toothed rims, the flanks of the teeth of the outer and of the inner toothed rims comprising circular arcs of the same radius, which corresponds to the radius of the pitch circle of the inner rim, the centre of said arcs of the teeth of the inner rim being situated on its pitch circle and the centre of said arcs of the teeth of the outer rim being situated on an auxiliary circle which is concentric to the pitch circle and which passes through the centres of curvature of the flanks of that tooth of the smaller rim which is in maximum engagement.

2. In an internal gearing two eccentric toothed rims, the flanks of the teeth of the outer and of the inner toothed rims comprising circular arcs of the same radius, which corresponds to the radius of the pitch circle of the inner rim, the centre of said arcs of the teeth of the inner rim being situated on its pitch circle and the centre of said arcs of the teeth of the outer rim being situated on an auxiliary circle which is concentric to the pitch circle and which passes through the centres of curvature of the flanks of that tooth of the smaller rim which is in maximum engagement, and the portion of the flanks of the teeth of the outer rim on the addendum of tooth being defined by straight lines corresponding to a tangent drawn from the point of intersection of the flank of the space of tooth in the point of maximum engagement with the pitch circle to an auxiliary circle which is concentric to the pitch circle of the inner rim and the diameter of which is equal to the radius of said pitch circle.

In testimony whereof I affix my signature.

SIMON HOLDENER.